United States Patent Office 3,388,991
Patented June 18, 1968

3,388,991
METHOD OF CONTROLLING UNDESIRED VEGETATION WITH POLYCHLOROPHENYL N-ALLYL-N-CYCLOHEXYLCARBAMATES
John J. D'Amico, Dunbar, W. Va., and Anton G. Weiss, Basel, Switzerland, assignors to Monsanto Company, St. Louis, Mo., a corporation of Delaware
No Drawing. Filed Aug. 12, 1964, Ser. No. 389,185
3 Claims. (Cl. 71—106)

ABSTRACT OF THE DISCLOSURE 2,4-dichlorophenyl- and 2,4,5-trichlorophenyl N-allyl-N-cyclohexylcarbamates, which compounds are useful for controlling undesired vegetation of the sorghum family.

This invention relates to a class of polychlorophenyl N-allyl-N-cyclohexylcarbamates, to selective herbicidal compositions and to methods for employing them.

One important development in agricultural chemistry has been the discovery of chemicals which act as selective herbicides. A suitable means of controlling wild sorghums and wild canes without harming desired vegetation is a major need at the present time. Generally, active compounds also control or destroy crops such as corn at concentrations toxic to wild sorghums.

It has now been discovered that certain polychlorophenyl N-allyl-N-cyclohexylcarbamates control wild sorghums and/or wild canes whether used as a pre-emergent treatment or as a post-emergent treatment. Many of the so-called wild canes and wild sorghums are strains of black amber sorghum. Black amber, although a commercial variety years ago, is not widely grown today. The scattered seed from the production of black amber is undoubtedly largely responsible for the wild cane or wild sorghum problem of today.

The polychlorophenyl N-allyl-N-cyclohexylcarbamates of the present invention are represented by the formula:

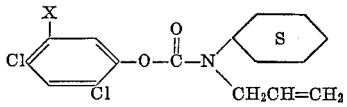

where X is hydrogen or chlorine. The compounds are readily prepared by reaction of N-allyl-N-cyclohexyl carbamoyl chloride with the appropriate chlorophenol. The following examples illustrate their preparation in detail.

Example 1

Into a suitable reaction vessel was charged 19.8 grams (0.1 mole) of 2,4,5-trichlorophenol, 70 ml. of acetone and 4 grams (0.1 mole) of sodium hydroxide. The mixture was heated to 46° C. and at this temperature there was added dropwise 20.2 grams (0.1 mole) of N-allyl-N-cyclohexyl carbamoyl chloride. After addition was complete the mass was refluxed for 5 hours. The product was then cooled, 250 ml. of water added and the product extracted with 250 ml. of ether. The ether layer was washed and the ether then removed under vacuum at 95–100° C./14 mm. Hg. 2,4,5-trichlorophenyl N-allyl-N-cyclohexylcarbamate was obtained in 14% yield as an amber oil. Analysis gave 3.9% nitrogen and 28.5% chlorine compared to 3.9% nitrogen and 29.3% chlorine calculated for $C_{16}H_{18}Cl_3NO_2$.

Example 2

Using the procedure of Example 1 but substituting an equivalent amount of 2,4-dichlorophenol for the 2,4,5-trichlorophenol, 2,4-dichlorophenyl N-allyl-N-cyclohexylcarbamate was obtained in theoretical yield as an amber oil. Analysis gave 4.4% nitrogen and 21.6% chlorine compared to 4.3% nitrogen and 21.6% chlorine calculated for $C_{16}H_{19}Cl_2NO_2$.

In general the compounds effectively control wild sorghums and wild canes by application thereto by which is meant either application to the soil whereby the toxicant is brought into contact with germinating seedlings or to foliage. The compounds are particularly valuable as post-emergent herbicides wherein the toxicant is applied to the foliage. Application may conveniently be in the form of a spray. The active components are insoluble in water but are soluble in common organic solvents. They may be dispersed directly in water or dissolved first in an organic solvent and then dispersed.

Table I illustrates post-emergent herbicidal activity of the compounds. In these tests the toxicant was emulsified in water and the emulsion applied as a spray. The active ingredient at 2 pounds in 200 gallons of solution per acre was applied to various sorghums and to corn. The sorghums were 4–6 inches tall and the corn 6–8 inches tall. Observations were made two weeks after application. For convenience in recording the data a numerical rating system was used as follows:

0–25% Inhibition _____ 0
26–50% Inhibition _____ 1
51–75% Inhibition _____ 2
76–99% Inhibition _____ 3
100% Kill _____ 4

TABLE I

| Toxicant | Herbicidal Rating | | | |
|---|---|---|---|---|
| | RS-650 Sorghum | Atlas Sorghum | Black Amber | Corn |
| 2,4,5-trichlorophenyl N-allyl-N-cyclohexylcarbamate | 2 (60%) | 3 (90%) | 3 (85%) | 0 |
| 2,4-dichlorophenyl N-allyl-N-cyclohexylcarbamate | 3 (95%) | 4 | 4 | 1 |

Herbicidal activity was also demonstrated by application to the ground before any plants emerged. Seeds of sorghum (Sorghum almum) were planted in greenhouse flats, 10 seeds to the pan, and the pans treated with the chemical at the dosages shown in Table II. After spraying, the pans were placed in a sand bench and allowed to absorb moisture through the perforated bottom. The pans were then kept in the sand bench in a greenhouse for 14 days, after which the plant growth was observed and ratings recorded. Ratings were based on the number of seedlings emerging as compared to expected percent germination. In the scale, a rating of 3 indicates severe phytotoxicity; 2, moderate phytotoxicity; 1, slight phytotoxicity whereas a rating of 0 indicates that the test chemical has no perceptible phytotoxic effect.

TABLE II

| Toxicant | Herbicidal Ratings against Sorghum after 14 day at Concentrations of— | | | |
|---|---|---|---|---|
| | 25#/A | 5#/A* | 2.5#/A* | 1#/A* |
| 2,4,5-trichlorophenyl N-allyl-N-cyclohexylcarbamate | 2 | 3 | 3 | 1 |
| 2,4-dichlorophenyl N-allyl-N-cyclohexylcarbamate | 3 | 3 | 3 | 2 |

*Toxicant incorporated in cover layer of soil.

Other pans were planted with representative grass and broadleaf plants and treated with 2,4,5-trichlorophenyl N-allyl-N-cyclohexylcarbamate and 2,4-dichlorophenyl N-allyl-N-cyclohexylcarbamate, respectively, at the rate of 25 pounds per acre. After 14 days, plant growth was observed and ratings recorded. The test plant and herbicidal ratings are recorded in Table III.

TABLE III

| Test Plant | Herbicidal Ratings Using Product of— | |
|---|---|---|
| | Example 1 | Example 2 |
| Wild oat | 0 | 0 |
| Brome | 0 | 0 |
| Rye grass | 0 | 0 |
| Radish | 0 | 0 |
| Sugar beet | 0 | 0 |
| Giant foxtail | 0 | 0 |
| Crab grass | 0 | 0 |
| Pigweed | 0 | 1 |
| Soybean | 0 | 0 |
| Wild buckwheat | 0 | 0 |
| Tomato | 0 | 0 |

The above data show the selective control afforded by the herbicidal compositions of this invention. Thus, they may be employed for the control of wild sorghum in plantings of corn, particuarly as a post-emergent treatment and in soybeans, sugar beets, and tomatoes as a pre-emergence treatment.

It is intended to cover all changes and modifications of the examples of the invention herein chosen for purposes of disclosure which do not constitute departures from the spirit and scope of the invention.

What is claimed is:

1. A method of controlling undesired vegetation of the sorghum family which comprises applying thereto in amount sufficient to exert a herbicidal action, a compound of the structure

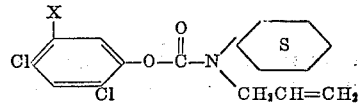

where X is selected from the group consisting of hydrogen and chlorine.

2. A method of controlling wild sorghums which comprises applying thereto in amount sufficient to exert a herbicidal action, 2,4-dichlorophenyl N-allyl-N-cyclohexylcarbamate.

3. A method of controlling wild sorghums which comprises applying thereto in amount sufficient to exert a herbicidal action, 2,4,5-trichlorophenyl N-allyl-N-cyclohexylcarbamate.

References Cited

UNITED STATES PATENTS 2,776,197  1/1957  Gysin et al. _____ 260—479

FOREIGN PATENTS 554,576  3/1958  Canada.

LORRAINE A. WEINBERGER, *Primary Examiner.*

RICHARD K. JACKSON, *Examiner.*

P. J. KILLOS, *Assistant Examiner.*